(No Model.)
J. SPARE.
ELASTIC PRESSURE WALKING CANE.
No. 340,738. Patented Apr. 27, 1886.
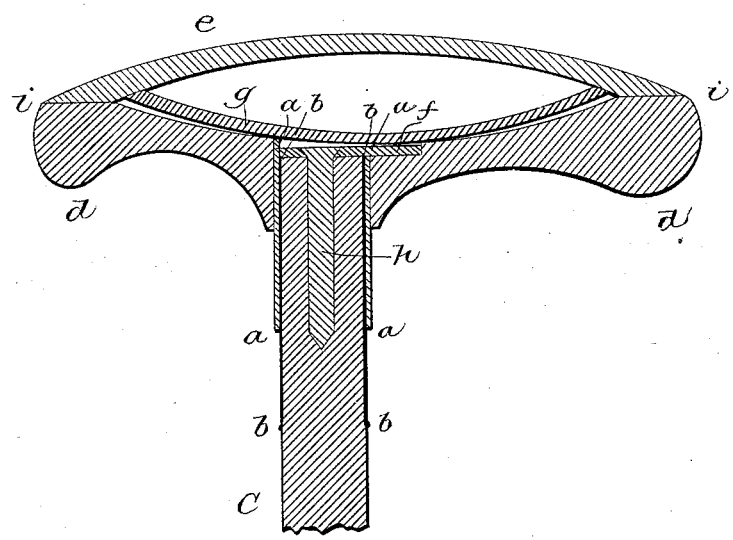
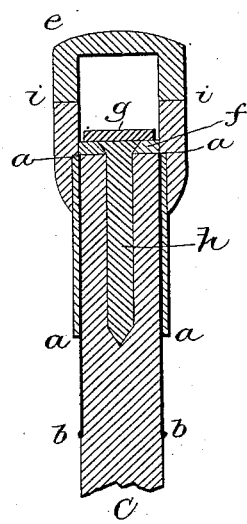
Witnesses:
Chas Fisher
Louis Jean
Inventor:
John Spare

UNITED STATES PATENT OFFICE.

JOHN SPARE, OF NEW BEDFORD, MASSACHUSETTS.

ELASTIC-PRESSURE WALKING-CANE.

SPECIFICATION forming part of Letters Patent No. 340,738, dated April 27, 1886.

Application filed April 27, 1885. Serial No. 163,634. (No model.)

*To all whom it may concern:*

Be it known that I, JOHN SPARE, of New Bedford, in the county Bristol and State of Massachusetts, have invented certain new and useful Improvements in Elastic Walking Canes, of which the following is a specification.

My invention consists in fixing what I call a "handle" about at right angles across the top of the cane, said handle being ordinarily (for adults) four and a half or five inches long, being convenient for the hand fully to clasp, and containing an excavation. This handle is conveniently made in two parts, an upper and a lower, of a selected hard and fine-grained wood, horn, ivory, shell, or other suitable material. The two parts are, when the excavation is occupied by certain intended springs, securely fastened together.

In the drawings, (both figures,) the handle is $d\,d\,e\,e$, the lower part being $d\,d$ and the upper part is $e\,e$, and $i\,i$ represent the plane of union of the two parts.

Figure 1 is a perpendicular central section and longitudinal, while Fig. 2 is a perpendicular transverse section, at that part of the handle corresponding with the staff of the cane.

As may be inferred from Fig. 2, the excavation is an entirely-closed space, and the handle gets its strength mainly from its sides and ends. The very top aspect of the handle is conveniently rounded longitudinally to accommodate the hollow of the hand of the user, as also to invite the hardest down-bearing at its highest point of crowning, which may preferably be over the staff of the cane. The top aspect of the handle is also rounded transversely. The whole surface of the handle is rounded and shaped underneath to accommodate the hand.

The object of this improvement in canes is the relief of human suffering of those persons who bear appreciably on a cane by its spring action, as the handle is intended to slide down as a whole and receive the staff the distance of three-fourths of an inch, and in the case of bone or horn handles (which by strength will admit of it) an entire inch. The excavation in the handle in vertical longitudinal section is conveniently ellipti-form, or its top and bottom are parts of circles, as shown in the unshaded space in Fig. 1. The shaded space is such exhibit of the handle as appears by section. All transverse sections of the excavation are parallelograms and of uniform horizontal transverse measurement of from five-eighths or three-fourths of an inch. The excavation in volume is a prism, in its most general sense upright, and its walls are surfaces of a cylinder—that, is supposing the handle laid down on its side.

In order to give the handle a greater dimension perpendicularly than the user can conveniently clasp, and to serve as a guide in the sliding action of the handle, a tube of metal or other strong material is screwed in or otherwise securely fastened in the lower part of the handle, as virtually a permanent part of the same. It may protrude about one inch, and is inserted sufficiently far, or about three-eighths of an inch, (entirely through which the cane-staff is to slide,) to make a very strong union. This tube is $a\,a\,a\,a$ in both figures, and it is most delicately turned or drilled inside. The shell of this tube if of brass, should be about one thirty-second inch in thickness, and should be nickel-plated outside. The upper end of the cane-staff is ferruled by a tube, which should be three-fourths of an inch longer than the one above mentioned, and its outside finely and smoothly turned to fit and slide in this tube fastened to handle. In both figures this tube is $b\,b\,b\,b$. The lower $b\,b$ and $c\,c$ represent a portion of the cane-staff. After the ferruled portion of the cane is inserted into the outer tube an arm, $f\,f$, consisting of a stiff piece of plate steel one and one-quarter inch long, one-sixteenth of an inch thick, and one-half or five-eighths inch wide, is screwed to the top of the cane by a screw one and three-fourths inch long (a section of which and its countersunk head is shown in the figures) by a powerful last turn of the screw-driver. The objects of this arm are to prevent the cane-staff from dropping out of the handle, to prevent its rotation, and to act in the springs now to be described. These springs are from five to eight in number, are slips of sheet steel one sixty-fourth of an inch thick, as wide as they can be, and play up and down easily in the excavation, and as long as they can be, that when straight their ends will not impinge unfavorably against the wall of the excavation at their ends. These springs are represented in mass by $g\,g$ on the floor of the excavation. They have a curvature somewhat greater than that floor, so that they are acting somewhat when the cane is not in use. It is intended that these springs shall bend upward in their complete action, so as to meet the roof of the excavation. Not all steel is of a quality to stand this action without breaking; but after some months of trial I have found that steel springs can be so tempered and be of such a quality as to answer the purpose. In case one or more should break after two or three months, they can be easily replaced with new ones by almost any person with only a small screw-driver, and the cost is very trifling for the springs. In the insertion of these springs in the excavation of the handle it is advisable to unify them in a mass and clasp them by a slip of the very thin japanned iron of "tin type," cut out with common shears two inches longer than the spring and made to lie flat against them on the upper side, and bent round the ends of the combined mass of springs. The top piece of the handle is screwed down to the lower piece by four screws five-eighths inch long, and the place of union is shown in the figures by $i\ i$.

I am aware that a crutch having a hollow handle and springs inserted therein, and also provided at its lower end with a tube and sliding device bearing on a spring, all to relieve and ease the shock consequent upon the bearing down or application of pressure upon the handle, is old, and such I do not claim, broadly; but

What I claim, and desire to secure by Letters Patent, is—

A walking-cane comprising in combination a hollow handle made in two parts or sections, a resisting-spring, $g$, within said handle, sliding tube $a$, tube $b$, angle-piece $f$, and screw $h$, the latter named passing through the angle-piece and entering downwardly into the stick, all substantially as and for the purpose set forth.

JOHN SPARE.

Witnesses:
GEORGE H. NYE,
JAMES C. S. TABER.